United States Patent Office 3,438,158
Patented Apr. 15, 1969

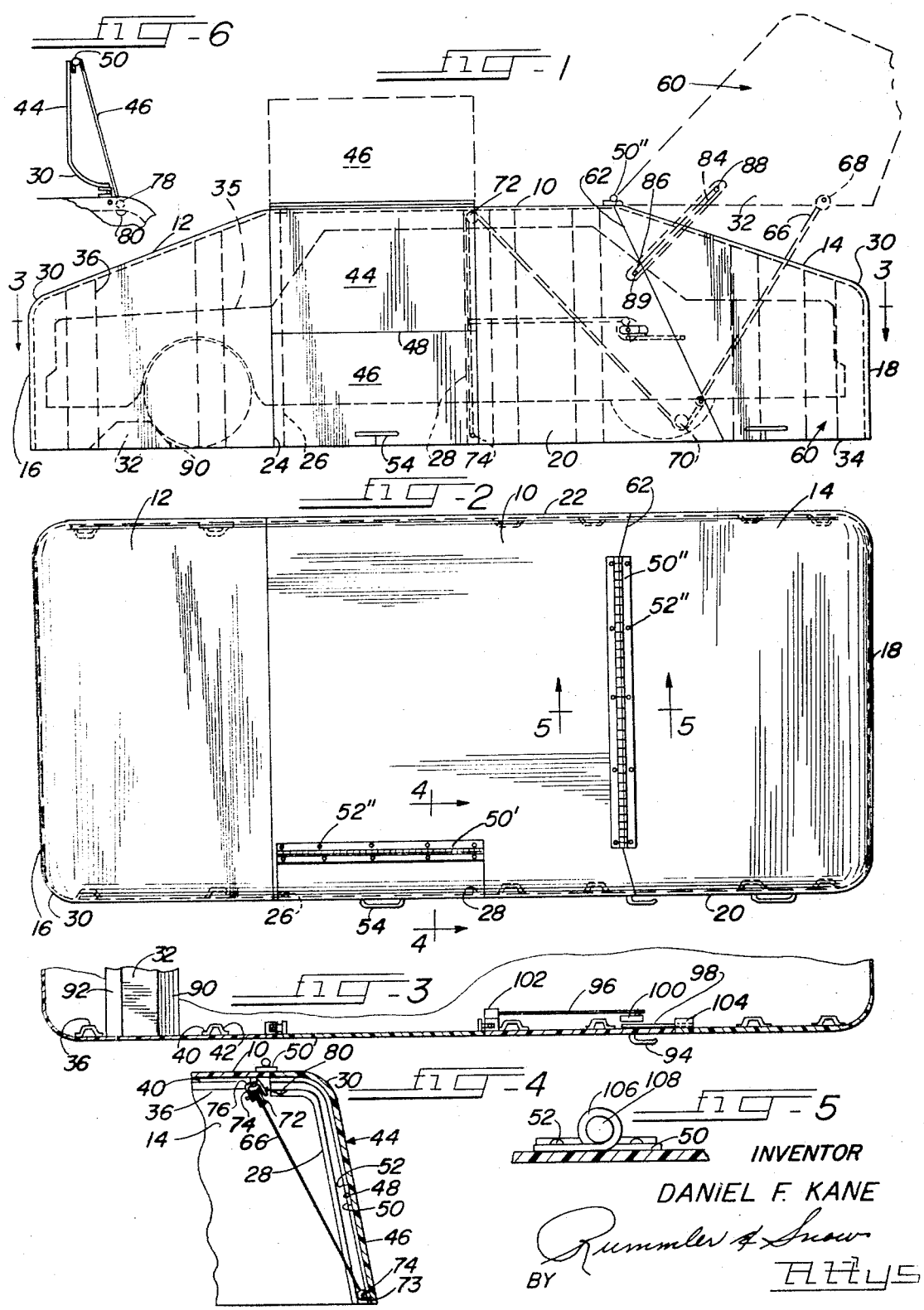

3,438,158
CAR POD
Daniel F. Kane, 1053 Liberty St., Aurora, Ill. 60505
Filed Aug. 21, 1967, Ser. No. 661,893
Int. Cl. E04b 1/346, 7/16; E04h 6/42
U.S. Cl. 52—64                    7 Claims

ABSTRACT OF THE DISCLOSURE

The disclosure describes an automobile shelter providing a lightweight plastic open-bottomed enclosure having side walls closely spaced from the automobile and an end opening door which when raised automatically raises a side door contiguous to the driver's door for ingress to and egress from the car. In one embodiment the roof is downwardly tapered at the rear end and the contoured spring-balanced end door is formed as part of the end, sides and sloping roof of the enclosure. Means are provided for double hinging the side door and extending same as a contour into the roof so that it is locked out of the way when open and conforms with the enclosure outlines when closed. Other embodiments are disclosed including the formation of the entire enclosure as a unit and cutting the side door sections and end door therefrom for use in the complete assembly.

The background of the invention

The invention concerns a lightweight, durable molded plastic automobile shelter which can be placed in any available parking area or at curb-side and used in the manner of a garage. The shelter of this invention has unitary body and door parts which fit together to form an integral enclosure. The shelter of this invention is easily transported by two persons and is formed of lightweight reinforced plastic so as to be strong and weatherproof.

Car shelters have been fabricated of thin plastic sheet, such as polyethylene in order to combine lightness of weight with weather proofness. These shelters are unsatisfactory because they must be removed by lifting same off the car and the edges tear in the wind and become soiled on the ground. In wet or snowy weather they tend to adhere to the body surfaces of the car and under freezing conditions are impractical and difficult to remove. Because these thin pliant shelters are easily rolled up, the incidence of theft is high. This type of shelter is best suited for the protection of cars that are not used every day.

Another type of car shelter has been proposed having partially rigid wall and roof panels made of aluminum, iron, steel, wood or plastic compositions. One such design is open ended and has a side door opening into the roof whereby access is provided for a person who is taller than the structure. The degree of protection of such a device is somewhat limited and the manner of control of the side door opening is cumbersome.

The device of this invention overcomes or mitigates the drawbacks of the prior art devices by providing a lightweight strong enclosure for five sides of the vehicle having a reinforced integral body with a rear access door which upon opening actuates and opens a side access door provided with an over-riding lock so that the shelter can be operated by one person. The device of this invention has a rigid body which is spaced from the car and is not subject to the difficulties inherent with plastic film or canvas covers. The device of this invention also is provided with locking means and means to prevent the front of the car from striking the front wall as the car is moved into position therein.

Summary of the invention

The present invention concerns a portable, or semi-permanent automobile shelter which is characterized by its lightweight and strong construction with side and end doors which open and close in unison and an automatic over-riding lock means to maintain the doors in open position for operation by one person. The present invention also concerns the design and fabrication of an inexpensive automobile shelter which can be molded as a single unit casting and the doors cut from the plastic casting for proper hinging and connection for operation in the facile manner described.

Accordingly, the primary objects of this invention are to provide an improved car shelter with enclosed roof and sides and an open bottom, which is easy to fabricate, economical, durable and easy to use. Other objects of this invention are to provide a car shelter which is tamperproof, can be operated by remote control and is weatherproof.

Description of the drawings

The specific embodiment of this invention is shown in the accompanying drawings in which:

FIG. 1 is a plan side view of the car shelter, showing the outline of a car therein and with the side and rear door open positions shown in dotted lines.

FIG. 2 is a top plan view of the car shelter of this invention.

FIG. 3 is a cross-sectional view taken along the lines 3—3 of FIG. 1.

FIG. 4 is a partial view in cross-section taken along the lines 4—4 of FIG. 2.

FIG. 5 is a partial view in cross-section taken along the lines 5—5 of FIG. 2, and FIG. 6 is a view of the side door in raised position.

The preferred embodiment

Referring to the drawings, particularly FIG. 1, the car shelter of this invention is shown to comprise a roof section 10, sloping roof sections 12 and 14, the end sections 16 and 18 and the two side sections 20 and 22 all formed of thin walled, rigid, filled plastic composition. The side wall 20 has an opening 24 with a pair of guide rails 26 and 28 (to be later described) attached therealong. The juncture of the sides 16, 18, 20 and 22 with the roof sections and with each other is a continuous curve, shown at 30, therealong. The shelter is open at the bottom except for the bumper member 32 which is affixed at its ends to the wall members 20 and 22. The bottom edge 34 is planar so that the shelter will fit flat to the ground. The outline of a car 35 is shown in dotted lines therein.

Each section has at least one reinforcing member 36 of cast U-shaped plastic with longitudinal flanges 40 forming a base for attachment to the inside surfaces of the sides and roof as by means of solvent-adhesive or rivets. The reinforcing members have their inner lonigtudinal spaces 42 filled with wood or cardboard stiffening members or may be left open. These reinforcing members can be continuous from side to side across the inside of the roof sections or in a staggered arrangement.

The side opening 24 is fitted with a door comprising two sections 44 and 46 attached one to the other along the juncture line or seam 48 by means of elongated piano-type hinge 50, held by means of rivets 52.

Referring to FIGS. 2 and 4, it is seen that the hinge 50 is placed on the inside of the seam 48. The top inwardly curved end of the section 44 and its juncture with the roof member is joined by means of the elongated piano-type hinge 50' similarly attached by rivets 52' on the outside of the shelter. The side bottom section 46 of the side door carries an outer handle 54 which can be constructed of plastic, wood or metal and suitably attached thereto as by means of screws (not shown). This handle can be formed as an integral part of the side door that is formed of plastic.

The rear or entrance portal of the shelter has a door 60 which is formed with roof section 14, the end section 18 and portions of the side walls 20 and 22 as integral parts thereof, joining to the main body of the shelter at juncture line 62 which is directed rearward from the roof line. The rear door 60 is affixed to the roof section by means of piano-type hinge 50''. The bottom edge 34 of the door 60 lies in the same plane as the bottom edge of the side panels when in closed position and is raised high enough to allow clearance of the car 35 in open position.

A cable 66 is affixed by means of the bolt 68 to one side edge of the door 60, passes through the pulley 70 on the inside bottom of the panel 20, diagonally upward to the roof pulley 72 and thence down to the door bolt 74. As shown in FIG. 4 the roof pulley 72 carried in yoke 74 is supported on the pintal 76 so that same can pivot as the angle of the cable changes. By raising the door 60, the cable 66 pulls the side door 46 upward from the bottom, causing it to pivot upon both of the hinges 50 and 50' and fold into the position shown in FIG. 6. Both doors thus open and close simultaneously.

In order to facilitate the folding action of the door 46 a roller 78 is provided at each bottom edge and corner which are engaged by the tracks 26 and 28. The upper ends of the tracks 26 and 28 bend into the roof with the curve roof line 30 and have a depression 80 which temporarily locks the rollers into the open position by engaging same as shown in FIG. 6. The tracks 26 and 28 are formed of metal or plastic and have a U-shaped cross section. The opening in the side is less than the diameter of a roller so that the rollers are retained therein and are free to roll along the length of the tracks. This construction is known in the art. A latch arm 82 with elongated slot 84 and recess 86 at one end is pivotally mounted on the pin 88 on the inside of the door 60 whereby in raised position the recess 86 engages a second pin 88, affixed on the inside of the side panel 20, and holds the rear door 60 open. The latch arm is released by lifting the recess 86 from the pin 89.

In FIG. 3, there is shown the bumper member 32 with front and rear ramps 90 and 92 for engaging the front wheels of the car 35. The bumper member 32 is placed on the ground with either ramp 90 or 92 facing toward the rear door 60 and may be affixed to the side walls or be retained by and between the reinforcing members 36 and 40. In a preferred embodiment, the bumper 32 is not affixed to the car shelter so that it can act as a brake for the front wheels. As the front wheels strike the ramp 90 and ride up on the inclined surface, the wheel ceases to rotate and skids under the remaining momentum of the car. This action transmits the inertia to the bumper member 32 and any remaining inertia is absorbed by the sliding action of the bumper 32 on the ground. If the car over-rides the bumper 32 the car itself can carry the entire shelter, which is strong enough to absorb this kind of shock.

In one embodiment the height A (FIG. 1), of the bumper is made slightly greater than the distance B from the car hood to the underside of the roof section 12. As the car rises on the ramp 90 the hood strikes the yielding plastic wall and raises the shelter sufficient for the reinforcing member 40 to be carried over the ramp and thus prevent damage to the shelter.

FIG. 3 also shows the handle 94 adapted to turn eccentrically mounted arms 96 and 98 carried by the pivot member 100. The end of the arm 96 registers with the apertured latch 102 on the inside of the panel 46 of the side door 46 and the arm 98 registers with the apertured latch 104 on the inside of the door 60. In the position shown in FIG. 3 the handle 94 is horizontal and the ends of the arms 96 and 98 are in engagement with the respective latches 102 and 104, in the locked position. By turning the handle 94 downwardly 90° the pivot member 100 is rotated and the arms 96 and 98 are moved toward the pivot member 100 to clear the latches, so that both doors are unlocked.

FIG. 5 shows the details of construction of the piano-type hinges 50 used for the doors of the car shelter wherein the alternate loops 106 of the hinge engage an elongated pin or rod 108 from opposite sides. If desired, a spring (not shown) can be used with each door to assist the opening action and offer slight resistance to the closing action of each so that the doors are counter balanced and readily opened and closed. The side door 44 can be made wide enough to accommodate a 2-door automobile or a four-door model, as desired.

The car shelter of this invention can be equipped with a heater, an alarm system, exterior and interior lights, insulation and may be operated by remote control. Various plastics can be used to mold the respective parts of the car shelter. The preferred material is a glass-fiber reinforced plastic such as phenol-formaldehyde, phenol-furfural, polyester, polystyrene resins and the like. Other fillers such as wood flour, asbestos, mica, macerated fabric, cord, sisal, felt, hair, rag, minerals and alpha cellulose can be used. The wall thickness can vary from about .04 to 0.1 inch. Ferro-cement may also be used.

The arrangement of the parts of the vehicle shelter thus far described and their cooperation one with the other makes the fabrication of the device of this invention both simple and economical. The walls, roof and doors are formed as a unit in a single mold by any of the known methods, such as vacuum forming using either a male or female mold. The door sections are next cut from the molded pod by sawing or use of a heated knife. The various hinges, braces, latches and other hardware are attached and the unit is assembled. The cutting of the door sections from a single mold has the advantage of mating each door with its respective opening and giving the necessary edge clearance for proper fit in closed position. Also any variations in wall thickness are automatically compensated for so that the outer surfaces at the junctures of the seams such as 48 are smooth and even. The unit can be made by the lamination technique or other methods of forming large plastic parts. Color can be added to the plastic or a separate spray coat of color can be applied.

I claim:
1. An enclosure for a vehicle comprising:
 (a) opposed spaced, upright side walls integral with
 (b) a roof wall having a downwardly sloping front section;
 (c) a rear door having side section and end wall and a downwardly sloping roof section said roof section of said rear door and said roof wall being transversely hinged together with the juncture of the side sections of said rear door and said side walls diverging rearward of said enclosure;
 (d) a side door comprising a lower section transversely hinged intermediate the ends to an upper section, said upper section extending inwardly into said roof wall and being transversely hinged thereto;
 (e) a guide rail contiguous to a side of said door;
 (f) roller means affixed to said lower section of said side door and adapted to travel within said guide means;
 (g) cable means connected between the side of said rear door and the bottom of the lower section of said side door;
 (h) pulley means engaging and holding the intermediate portions of said cable adjacent the bottom of said side wall and at the top inside of said roof wall, whereby the raising of said rear door automatically raises said side door causing same to fold upon itself with its lower edge contiguous to said transverse roof hinge.

2. An enclosure for a vehicle in accordance with claim 1 in which said side walls have spaced upright hollow flanged reinforcing ribs extending along the inside thereof.

3. An enclosure for a vehicle in accordance with claim 2 in which the hollow of said ribs is filled with reinforcing material.

4. An enclosure for a vehicle in accordance with claim 1 in which a wheel stop member is provided transverse the front of said enclosure to engage the wheels of said vehicle.

5. An enclosure for a vehicle in accordance with claim 4 in which the height of said wheel stop member is greater than the clearance between the hood of said vehicle and the inside surface of said front roof section.

6. An enclosure for a vehicle in accordance with claim 4 in which said wheel stop member has a forwardly inclined surface to engage the wheels of said vehicle.

7. An enclosure for a vehicle in accordance with claim 1 in which said guide rail has a detent adjacent the transverse hinge of said upper section, said detent adapted to engage said roller and retain same by the weight of said side door in open position.

References Cited

UNITED STATES PATENTS

| | | | |
|---|---|---|---|
| 1,562,600 | 11/1925 | Taylor | 52—64 |
| 1,709,459 | 4/1929 | Callahan | 49—395 X |
| 1,919,328 | 7/1933 | Hansen | 49—395 X |
| 2,282,324 | 5/1942 | Everitt | 52—174 X |
| 3,277,621 | 10/1966 | Merdich | 52—174 X |

FOREIGN PATENTS

| | | |
|---|---|---|
| 1,059,849 | 3/1954 | France. |
| 572,414 | 3/1933 | Germany. |
| 924,871 | 5/1963 | Great Britain. |

OTHER REFERENCES

Rubber stop on floor, p. 148, Popular Mechanics, February 1959.

FRANK L. ABBOTT, *Primary Examiner.*

C. G. MUELLER, *Assistant Examiner.*

U.S. Cl. X.R.

188—28; 52—174; 49—114